April 2, 1963  G. R. MOTT  3,083,623
TRANSFERRED IMAGE APPARATUS
Filed Sept. 17, 1959

INVENTOR.
GEORGE R. MOTT
BY Stanley B Cole
ATTORNEY 3,083,623
TRANSFERRED IMAGE APPARATUS
George R. Mott, Rochester, N.Y., assignor to Xerox
Corporation, a corporation of New York
Filed Sept. 17, 1959, Ser. No. 840,572
11 Claims. (Cl. 95—1.7)

This invention is generally concerned with xerography and particularly with the projection of images through xerography and is a continuation in part of co-pending application Serial No. 738,520, filed May 28, 1958.

The projection of an optical image onto a screen, whether as a still or moving picture, has long been a means of audience entertainment. More recently, the art has been called upon to assume the even more responsible role of educating for information and enlightenment.

The growth in the use of projected visual materials has been possible largely because of readily available photographic techniques, camera, transparencies, and films. The direct use of opaque materials in projection systems, on the other hand, has been limited to a few applications in education and business, because such subjects do not conveniently lend themselves to large bright display. Pictures on paper have, therefore, remained materials for personal direct viewing, while transparencies and films have become the ordinary media for mass communication.

Despite the wide use of photography in creating visual displays, there are many conceivable instances where it leaves much to be desired. For example, when the time lapse between data input, in the form of exposure to a light image, and projection of the recorded information to a screen must, of necessity, be very short—perhaps one to two seconds or less—then the photographic process becomes, at the least, complicated and expensive. Quick displays of electronic data can, of course, be made by television and direct-view storage tube systems, but the ultimate screen size and brightness of the display are severely restricted.

In recent years, military planners have found that in order to gear the planning of strategy to the tempo of modern warfare, new techniques of data collection and display are required. Some of these methods involve projecting visual data of many types onto a screen which is viewed by planning personnel. The information may be stored in tables, charts, or in electronic computers, and presented on other charts, maps, or cathode-ray tube screens. In any case, the data must be collected rapidly and projected onto a screen for viewing by several people. Similar applications may well exist in the business world.

Through newly-devised and unorthodox methods, the known xerographic process has been adapted to produce a bright display of input data in the form of an optical image. Of prime importance is the fact that the time lapse between exposure and projection can be as short as one second or less.

It is accordingly a principal object of the present invention to provide methods and apparatus for the xerographic production of brilliant displays in which the xerographic image is transferred to a highly reflective surface.

It is a further object of this invention to provide methods and apparatus for a continuous moving xerographic projected display in which a xerographic powder image is continuously transferred to a reflective surface.

It is still a further object of the present invention to provide methods and apparatus for recording and projecting information in which the display may be made stationary while recording continues.

Further objects will become apparent from the following description and drawing in which.

Xerography is a photo-reproduction process based on physical rather than chemical phenomena. A re-usable photoconductive insulating surface which is not damaged by exposure to light, radioactivity, or ionizing radiation is first sensitized to light by depositing an electrical charge uniformly on it in darkness. Exposure to a light pattern, either by contact or projection, then reduces the original charge at any point in proportion to the light intensity, thereby forming a latent electrostatic image. Development to yield a visible image is accomplished by various methods of dusting the electrostatic image with charged powder particles. Once formed, the powder image can either be used for projection directly from the plate surface, transferred to another surface for remote projection, or to paper for use as "hard copy." The photoconductor can be cleaned and re-used for thousands of cycles.

Figure 1:
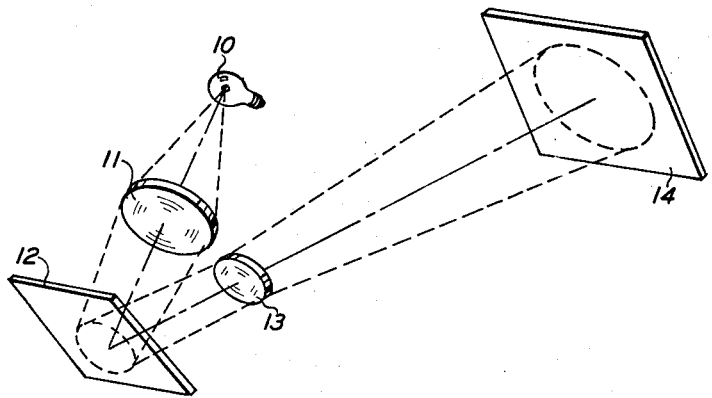
FIG. 1 is a schematic perspective view showing the projection system employed in the invention.

A new type of projection system has been devised which is called PROXI, a coined name for "Projection by Reflection Optics of Xerographic Images." Basically, and in its usual form, the PROXI optical system as shown, for example, in FIG. 1 makes use of the surface reflectivity of the xerographic plate. About 25% of the visible light incident on an amorphous selenium plate is reflected specularly. Accordingly, the reflective plate and any light scattering powder thereon constitute a contrasty optical image when viewed in specular light. If a collimated beam of light is incident upon the surface of the plate, it remains collimated in the specular non-dusted areas and can be picked up efficiently by a lens and projected in image configuration onto a screen. Meanwhile, the dusted areas will scatter and absorb light.

Referring to FIG. 1, a light source 10 produces a beam of light which is optionally collimated and made converging by a condensing system 11 and projected onto the surface of xerographic plate 12 from which it is specularly reflected and brought to a focus at the position of projection lens 13. The xerographic plate 12 serves not only as a mirror to fold the optical system, but contains a powder image representing the information to be projected. Light scattered and absorbed by the powder is lost from the optical system and thus when an image on the surface of plate 12 is focused on an opaque or translucent screen 14 by lens 13, the powder areas appear as black or white. The powder image can later be transferred to paper or other support for permanent storage if so desired. This opaque projection system gives high efficiency comparable to that of a transparency projector rather than the low efficiency of an opaque projection. This difference is a direct consequence of the fact that the light is collected effectively through specular reflection rather than ineffectively by scattering on a non-specular surface. Accordingly, screen brightness can be very high, as high as 100 foot-lamberts, in addition to high image contrast and definition.

Table I below summarizes the relative screen brightnesses obtainable with the system of FIG. 1 using various materials at the reflection point. These measurements were made using a 250-watt mercury lamp for light source 10, a 6½ inch diameter, 9 inch focal length condenser 11, a 7¼ inch F 4.5 lens for projection lens 13, and a plate-to-screen magnification of 5 diameters.

*Table I*

| Material: | Relative brightness |
|---|---|
| Polished aluminum | 100 |
| Selenium | 30.5 |
| Glossy photo paper | 5.0 |
| Semi-matte paper | 3.0 |
| White bond paper | 2.5 |

Measured values of absolute reflectivity for the polished aluminum and selenium surfaces are 82% and 27% respectively. It is significant to observe the great loss of brightness for the non-specular surfaces, even for the so-called "glossy" paper.

The PROXI system, in addition to giving high brightness, offers an advantage in providing images of excellent contrast. The light scattering and absorbing properties of fine powders in the PROXI system are best illustrated by comparing the photographic densities produced by a powder image when projected by the PROXI system, when projected by a transparency system, and when projected by conventional opaque projection. A test was made by exposing a xerographic plate to a gray scale and developing the plate by known powder cloud methods so that each successive step contained an increasingly greater quantity of powder per unit area. This image was then projected in a PROXI system and the brightness ratios of the various steps were measured. Subsequently, the powder from one half of each step was completely transferred to a transparent film while the other half of each step was transferred to gelatin coated paper. The density of the various steps on the transparent film and on the paper were measured using commercial densitometers and the results compared with the PROXI results.

Figure 2:
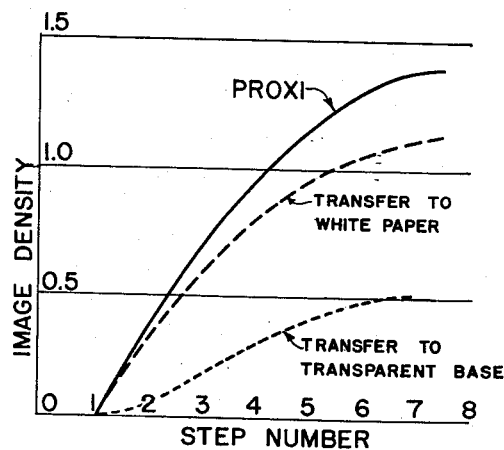
FIG. 2 is a set of curves showing the relative density of images when projected by different systems; and, FIG. 3 is a schematic perspective view of projection apparatus according to the invention.

FIG. 2 summarizes the results of this test. For a given powder image PROXI clearly gives the greatest contrast and the transparency system gives the least. Thus, a given quantity of powder is most efficiently used to produce a visual image in the PROXI system and, conversely, a PROXI display can produce data at a given contrast level with a smaller amount of powder such as may result from reduced exposure or reduced development in the xerographic process.

In spite of the obvious benefits of a PROXI system as described above, the screen size and brightness of the projected image are limited by the characteristics of the selenium or other photoconductor. Exposure to high light levels is necessary during the projection step in order to obtain high screen brightness, and although xerographic plates can be manufactured in such a way that their behavior is reproducible cycle to cycle despite high exposure to light, nevertheless, there is an upper limit of exposure which plates can tolerate.

On the basis of preliminary experiments, it is felt that plate behavior can be sufficiently reproducible for small screen displays up to 21 inches in diameter, at brightnesses up to 100 foot-lamberts, and for large audience presentation screens up to 8 x 10 feet at brightnesses up to 10 foot-lamberts. In any case a selenium plate must be kept from reaching temperatures in excess of 100 to 110° F. by air cooling or similar means to avoid its impairment as a photoconductor.

As a further point limiting screen size and brightness, the specular reflection coefficient of selenium is not as great as can be obtained with polished or evaporated metal layers.

In view of the fact that selenium plates are limited as to the light and operating temperatures to which they can be exposed, a reflection system has been devised to overcome these restrictions. Basically, the concept involves the formation of a powder image on a highly-polished metal plate, or metallized plastic film, and the use of this surface in place of the selenium or other photoconductor. Since the metal plate is inert and durable, light levels and operating temperatures are essentially unrestricted. By means of this basic approach, it is possible to project bright images onto very large screens.

Figure 3:
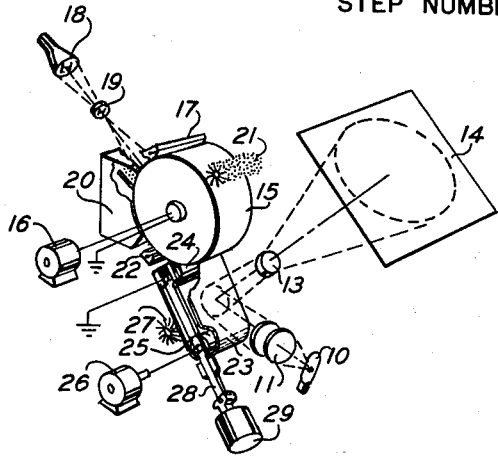

Turning now to FIG. 3 it is seen that the apparatus according to the present invention includes a xerographic drum 15 which is rotated by motor 16. Drum 15 generally comprises a cylindrical conductive element with a coating on the periphery thereof of photoconductive insulating material. It may, for example, comprise a thin cylindrical aluminum shell with a vacuum deposited coating of vitreous selenium. Suitable drums of this type are available from Haloid Xerox Inc., Rochester, New York under the trademark Copyflo. Xerographic drum 15 passes under a corona charging bar 17 where it receives a uniform surface electrostatic charge and is then exposed to light from cathode ray tube 18 as focused by lens 19. Light from the cathode ray tube selectively discharges the surface of the drum, thus forming thereon an electrostatic charge pattern corresponding to the light patterns projected from the cathode ray tube. Drum 15 next passes through a development system 20 where finely divided charged powder particles are poured over the drum surface. In accordance with known xerographic principles the powder particles adhere selectively either to the charged or uncharged areas of the drum. There is also shown in contact with the drum a cleaning brush 21 which is rotated about its axis by a motor or other drive means, not shown. Brush 21 serves to remove any powder remaining on the surface of the drum in order to permit the re-use thereof.

The elements so far described comprise a conventional xerographic recording apparatus, and accordingly, many and various modifications may be made in accordance with generally known principles of xerography. Thus, the photoconductive insulating surface of drum 15 may comprise any of the various known photoconductive insulating materials and development system 20 may comprise any of the various development systems known in xerography. Cathode ray tube 18 and lens 19 may likewise be replaced by other sources of original image information such as conventional opaque projection systems, moving transparency projectors, contact exposure to transparencies, or the like. Drum 15 may also be replaced by a flexible xerographic web in which case the web may be made to lie in a flat plane for exposure or other processing. This will enable a conventional full frame type of exposure to be made on the xerographic element, either by very short exposure while the element is in motion or by a conventional exposure with the element stopped. These and other modifications to the xerographic portion of the apparatus will be obvious to those skilled in the art and are intended to be encompassed within the scope of the present invention.

There is also shown a second corona or other charging bar 22 positioned and adapted to apply an electrostatic charge to xerographic drum 15 subsequent to development thereof and a web 23 contacting drum 15 after charging bar 22, but before cleaning brush 21. Web 23 is supported by rollers 24 and 25 and is adapted to be driven by motor 26. Roller 24 will generally be electrically conductive. Motor 26, however, is normally de-energized and web 23 is thus driven in synchronism with drum 15 through frictional and electrostatic forces existing between them. Also shown is a rotatable cleaning brush 27 contacting one surface of web 23, a set of slidable rails 28 (only one of which is shown) upon which web 23 and associated elements are mounted and a solenoid 29 adapted to move rails 28 and thus web 23 out of contact with drum 15.

Web 23 is made of a flexible and highly specular material. Thus, it may comprise a thin sheet of polished aluminum, chrome-plated steel, stainless steel, or the like. Ordinary steel could also be used, but it is susceptible to rusting which would destroy its specularity. A plastic film with an evaporated or chemically deposited conductive coating represents another suitable material for web 23. As shown in the drawing, drum 15 and roller 24 are operated at the same potential. It has been found that the use of charging bar 22 combined with the operation of drum 15 and roller 22 at or near the same potentials causes substantially all of the powder image formed on drum 15 to be transferred to web 23. This transferred image moves together with the web by which it is supported until it reaches the substantially flat area of the web supported between rollers 24 and 25. Here the powder image is projected onto a screen 14 by a light source 10, a condenser 11 and a projection lens 13 positioned as shown in FIG. 1 and operating according to the principles described in connection with FIG. 1. Optionally, the system described fully in co-pending application U.S. Serial No. 815,475 may be employed.

With the apparatus adjusted as shown in FIG. 3, there is formed on screen 14 a brilliant continuously moving display corresponding to the light output of cathode ray tube 18 and only slightly delayed in time from the display on the cathode ray tube itself. When, however, solenoid 29 is energized, web 23 is pulled slightly out of contact with drum 15 and ceases to move. A stationary display is thus formed on screen 14. Motor 26 can be used to re-position this display if desired. When solenoid 29 is de-energized, web 23 is again brought into contact with drum 15, the projected image is again in motion, and a new image is continuously transferred to web 23. Cleaning brush 27 erases the powder image from web 23 after the image has been projected, thereby preparing web 23 for re-use. When web 23 is out of contact with drum 15 the drum may be stopped, may record a limited amount of information and stop, or may record continuously. Any information recorded on drum 15 in the form of a powder pattern may be transferred to web 23 at any time and thus be projected onto screen 14. Other transfer stations may also be provided to remove images from the surface of the drum.

There is thus provided xerographic projection apparatus which is adapted to the recording and brilliant projection of images without subjecting the xerographic element itself to high levels of illumination. The apparatus is adapted to record and project continuously, or to record and continuously and project intermittently, or to record and project intermittently. Various modifications in the apparatus and various uses therefore will be obvious to those skilled in the art and are intended to be encompassed within the invention.

What is claimed is:

1. Xerographic recording and projection apparatus comprising in combination xerographic means to form an electrostatic charge pattern conforming to an image pattern to be reproduced and to deposit powder on a movable recording member in the form of a powder pattern conforming to said electrostatic charge pattern, a transfer member comprising an endless loop of specularly reflective material including at least one substantially flat region, means to transfer the powder pattern from the image recording member to powder free portions of the specularly reflective loop, means to move said loop portions bearing the transferred powder image into said flat region, and projection means comprising a light source and condenser directing light to the flat region of said loop, a lens collecting light specularly reflected from said loop and a screen at which the light reflected from said loop is imaged by said lens.

2. Apparatus according to claim 1 including means to optionally eliminate contact between said transfer member and said movable recording member.

3. Apparatus according to claim 1 in which said recording member comprises a photoconductive insulating layer overlying a conductive backing.

4. Apparatus according to claim 3 in which said transfer member includes a conductive layer.

5. Apparatus according to claim 4 including means to charge said powder pattern prior to transfer to said transfer member and including means to maintain the conductive backing of said recording member and the conductive layer of said transfer member at substantially the same potential at the region of contact between said recording member and said transfer member.

6. Apparatus according to claim 5 including means to optionally eliminate contact between said transfer member and said movable recording member.

7. Apparatus according to claim 6 including means to separately drive said transfer member.

8. Xerographic recording and projection apparatus comprising in combination xerographic means to deposit powder on a movable recording member following formation thereon of an electrostatic latent image in the form of a powder pattern, said recording member comprising a photoconductive insulating layer overlying a conductive member, an endless loop of electrically conductive specularly reflective material including at least one substantially flat region, corona charging means to deposit a uniform electrostatic charge on the movable recording member and the powder image pattern thereon, means to bring the endless loop into contact with the movable recording member at a position subsequent to the charging thereof, means to maintain the conductive member of said recording member and the endless loop at substantially the same electric potential, means to synchronously move the recording member and the endless loop whereby the powder pattern is transferred from the recording member to the endless loop, and projection means comprising a light source and condenser directing light to the flat portion of said loop, a lens collecting light specularly reflected from said loop and a screen at which the light reflected from said loop is imaged by said lens.

9. Xerographic recording and projection apparatus comprising in combination xerographic means to deposit powder on a movable recording member in the form of a powder pattern, said recording member comprising a photoconductive insulating layer overlying a conductive member, an endless loop of electrically conductive specularly reflective material including at least one substantially flat region, corona charging means to deposit a uniform electrostatic charge on the movable recording member and the powder pattern thereon, means to maintain the conductive member of the recording member and the endless loop at substantially the same electric potential, means to optionally bring the endless loop into contact with the recording member at a position subsequent to the charging thereof and to move the endless loop synchronously with the recording member whereby the powder pattern on the recording member is optionally transferred to the endless loop, means to optionally and independently move the recording member and the endless loop, and projection means comprising a light source and condenser directing light to the flat portion of said loop, a lens collecting light specularly reflected from said loop and a screen at which the light reflected from said loop is imaged by said lens.

10. Xerographic recording and projecting apparatus comprising a xerographic drum with a coating of photoconductive insulating material on the circumference thereof, means to rotate said drum about its axis, means positioned adjacent the circumference of the drum to in sequence electrostatically charge the drum, expose the drum to a light pattern, develop the drum with finely divided powder particles, further charge the drum and the powder particles thereon, and remove residual powder particles from the drum, an endless flexible electrically conductive specularly reflective belt tautly supported between two rollers, each of said rollers being rotatably mounted and parallel to the drum and one of said rollers pressing the endless belt against the surface of the xerographic drum at a point subsequent to the further charging of the drum and prior to the removal of the residual powder particles therefrom, means to maintain the drum and the endless belt at substantially the same electric potential, and projection means comprising a light source and condenser directing light to the endless belt at a position between said rollers, a lens collecting light specularly reflected from said belt and a screen at which the light reflected from said belt is imaged by a lens.

11. Xerographic recording and projecting apparatus comprising in combination xerographic means to form an electrostatic charge pattern conforming to an image pattern to be reproduced and to deposit powder on a movable recording member in the form of a powder pattern conforming to said electrostatic charge pattern, drive means for said movable recording member, a transfer member comprising an endless loop including at least one substantially flat region, means to transfer the powder pattern from the image recording member to powder-free portions of said transfer member, means to move said loop portions bearing the transferred powder image into said flat region, said means to move said loop portions being controllable separate from drive of said recording member to independently selectively actuate and determine position and movement of said loop portions, and projection means positioned and disposed relative to said flat region to project a powder pattern image onto a viewing screen forming a viewable image on said screen conforming to said powder pattern.

References Cited in the file of this patent

UNITED STATES PATENTS

| | | |
|---|---|---|
| 2,755,715 | Tuttle et al. | July 24, 1956 |
| 2,831,409 | Bixby et al. | Apr. 22, 1958 |
| 2,853,701 | Freedman et al. | Sept. 23, 1958 |

FOREIGN PATENTS

| | | |
|---|---|---|
| 723,534 | Great Britain | 1955 |